United States Patent
Tu et al.

(10) Patent No.: US 11,661,813 B2
(45) Date of Patent: May 30, 2023

(54) ISOLATION PLUGS FOR ENHANCED GEOTHERMAL SYSTEMS

(71) Applicant: Schlumberger Technology Corporation, Sugar Land, TX (US)

(72) Inventors: Huilin Tu, Sugar Land, TX (US); Mitchell Gamble, Calgary (CA); Laurent Alteirac, Missour City, TX (US); Bhushan Pendse, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 17/322,946

(22) Filed: May 18, 2021

(65) Prior Publication Data
US 2021/0363854 A1    Nov. 25, 2021

Related U.S. Application Data

(60) Provisional application No. 63/027,242, filed on May 19, 2020.

(51) Int. Cl.
*E21B 33/129* (2006.01)
*E21B 23/01* (2006.01)
*E21B 47/11* (2012.01)

(52) U.S. Cl.
CPC ............ *E21B 33/129* (2013.01); *E21B 23/01* (2013.01); *E21B 47/11* (2020.05); *E21B 2200/08* (2020.05); *E21B 2200/20* (2020.05)

(58) Field of Classification Search
CPC .. E21B 33/12; E21B 33/1208; E21B 33/1213; E21B 33/128; E21B 33/129; E21B 33/1292; E21B 33/1293
See application file for complete search history.

(56) References Cited

U.S. PATENT DOCUMENTS

| | | |
|---|---|---|
| 1,476,727 A | 12/1923 | Quigg |
| 2,230,712 A | 2/1941 | Bendeler |
| 2,364,419 A | 12/1944 | Barnes |

(Continued)

FOREIGN PATENT DOCUMENTS

| | | |
|---|---|---|
| CN | 103261582 A | 8/2013 |
| CN | 103835677 A | 6/2014 |

(Continued)

OTHER PUBLICATIONS

International Search Report and Written Opinion of the PCT Application No. PCT/CA2017/050555, filed Aug. 29, 2017 (6 pages).

(Continued)

*Primary Examiner* — Kenneth L Thompson
(74) *Attorney, Agent, or Firm* — Michael Wills, III

(57) ABSTRACT

An element includes an elastomer having a temperature rating of at least 400° F. for enhanced geothermal system applications. The elastomer element may be manufactured via an additive manufacturing process, and the elastomer element may be a component of an isolation plug assembly having a plurality of structural components that may also be manufactured via the additive manufacturing process.

10 Claims, 3 Drawing Sheets

(56) References Cited

U.S. PATENT DOCUMENTS

| | | | |
|---|---|---|---|
| 4,697,640 A * | 10/1987 | Szarka | E21B 33/1295 |
| | | | 166/182 |
| 4,735,264 A | 4/1988 | Burris, II et al. | |
| 4,901,794 A | 2/1990 | Baugh et al. | |
| 5,353,873 A | 10/1994 | Cooke, Jr. | |
| 5,390,737 A * | 2/1995 | Jacobi | E21B 29/00 |
| | | | 166/134 |
| 5,819,846 A | 10/1998 | Bolt, Jr. | |
| 6,443,458 B1 | 9/2002 | Jansch | |
| 6,538,576 B1 | 3/2003 | Schultz et al. | |
| 6,766,854 B2 | 7/2004 | Ciglenec et al. | |
| 7,140,434 B2 | 11/2006 | Chouzenoux et al. | |
| 8,211,248 B2 | 7/2012 | Marya | |
| 8,231,947 B2 | 7/2012 | Vaidya et al. | |
| 8,469,109 B2 | 6/2013 | Wang et al. | |
| 8,567,494 B2 | 10/2013 | Rytlewski et al. | |
| 8,839,855 B1 | 9/2014 | McClinton et al. | |
| 8,899,317 B2 * | 12/2014 | Frazier | E21B 33/129 |
| | | | 166/123 |
| 9,033,041 B2 | 5/2015 | Baihly et al. | |
| 9,045,963 B2 | 6/2015 | Shkurti et al. | |
| 9,212,547 B2 | 12/2015 | Miller et al. | |
| 9,982,505 B2 | 5/2018 | Rytlewski et al. | |
| 9,988,867 B2 | 6/2018 | Jacob et al. | |
| 9,988,870 B2 | 6/2018 | Gray | |
| 10,138,706 B2 | 11/2018 | Baihly et al. | |
| 10,233,720 B2 | 3/2019 | Tse et al. | |
| 10,301,910 B2 | 5/2019 | Whitsitt et al. | |
| 10,301,927 B2 | 5/2019 | Sallwasser | |
| 10,316,616 B2 | 6/2019 | Stafford et al. | |
| 10,352,121 B2 * | 7/2019 | Wise | E21B 23/08 |
| 10,364,629 B2 | 7/2019 | Jacob et al. | |
| 10,450,829 B2 | 10/2019 | Melenyzer et al. | |
| 10,458,200 B2 | 10/2019 | Tse | |
| 10,508,526 B2 | 12/2019 | Ring et al. | |
| 10,538,988 B2 | 1/2020 | Pabon | |
| 10,619,084 B2 * | 4/2020 | Okura | E21B 33/1208 |
| 10,738,561 B2 * | 8/2020 | Kobayashi | E21B 33/1208 |
| 10,801,315 B2 * | 10/2020 | Fripp | E21B 47/26 |
| 2004/0241049 A1 * | 12/2004 | Carvalho | B29C 43/52 |
| | | | 264/293 |
| 2010/0186970 A1 * | 7/2010 | Burnett | E21B 33/1216 |
| | | | 166/134 |
| 2010/0276159 A1 | 11/2010 | Mailand et al. | |
| 2011/0139466 A1 * | 6/2011 | Chen | C08L 71/00 |
| | | | 166/387 |
| 2013/0133883 A1 | 5/2013 | Hill, Jr. | |
| 2013/0140042 A1 | 6/2013 | Benson et al. | |
| 2014/0363692 A1 | 12/2014 | Marya et al. | |
| 2015/0107825 A1 | 4/2015 | Miller et al. | |
| 2015/0176386 A1 | 6/2015 | Castillo et al. | |
| 2015/0300121 A1 | 10/2015 | Xu | |
| 2016/0097269 A1 | 4/2016 | Kuehl et al. | |
| 2016/0138362 A1 * | 5/2016 | Dockweiler | E21B 33/1291 |
| | | | 166/138 |
| 2016/0186511 A1 | 6/2016 | Coronado et al. | |
| 2016/0265304 A1 | 9/2016 | Liu et al. | |
| 2016/0290095 A1 | 10/2016 | Cromer | |
| 2016/0348485 A1 | 12/2016 | Castillo et al. | |
| 2017/0130553 A1 | 5/2017 | Harris et al. | |
| 2017/0138150 A1 | 5/2017 | Yencho | |
| 2017/0145781 A1 | 5/2017 | Silva | |
| 2017/0335644 A1 | 11/2017 | Ciezobka | |
| 2017/0335678 A1 * | 11/2017 | Ciezobka | E21B 47/07 |
| 2017/0362914 A1 | 12/2017 | Wise et al. | |
| 2018/0112486 A1 | 4/2018 | Potts et al. | |
| 2018/0252091 A1 | 9/2018 | Bustos et al. | |
| 2018/0340391 A1 | 11/2018 | Gray | |
| 2018/0371895 A1 | 12/2018 | Taal | |
| 2020/0149381 A1 | 5/2020 | Ring et al. | |
| 2020/0316822 A1 * | 10/2020 | Bourquard | B29C 33/3857 |
| 2020/0325748 A1 | 10/2020 | Sanchez et al. | |
| 2020/0347694 A1 | 11/2020 | Power et al. | |
| 2021/0317724 A1 * | 10/2021 | Romer | E21B 34/142 |
| 2022/0056779 A1 | 2/2022 | Aviles et al. | |

FOREIGN PATENT DOCUMENTS

| | | | |
|---|---|---|---|
| CN | 103857872 A | | 6/2014 |
| CN | 104514513 A | | 4/2015 |
| CN | 104989317 A | | 10/2015 |
| CN | 106460504 A | | 2/2017 |
| CN | 108180014 A | | 6/2018 |
| RU | 2316643 C2 | | 2/2008 |
| RU | 2382197 C1 | | 2/2010 |
| RU | 2397319 C2 | | 8/2010 |
| RU | 2467160 C2 | | 11/2012 |
| RU | 2469180 C2 | | 12/2012 |
| RU | 2469188 C2 | | 12/2012 |
| RU | 2492318 C2 | | 9/2013 |
| RU | 154511 U1 | | 8/2015 |
| RU | 2633883 C1 | | 10/2017 |
| RU | 2668602 C1 | | 10/2018 |
| WO | 2018160070 A1 | | 9/2018 |
| WO | 2018184742 A1 | | 10/2018 |
| WO | 2019023413 A1 | | 1/2019 |
| WO | 2020131991 A1 | | 6/2020 |
| WO | 2022164621 A1 | | 8/2022 |

OTHER PUBLICATIONS

International Preliminary Report on Patentability issued in PCT Application No. PCT/CA2017/050555, dated Nov. 6, 2018 (4 pages).

Decision of Grant issued in the RU application 2018140969, dated Aug. 27, 2020 (15 pages).

Office Action issued in the CN application 201780041754.3, dated Oct. 29, 2020 (9 pages).

International Search Report and Written Opinion issued in PCT Application PCT/US2019/067046, dated Apr. 23, 2020 (12 pages).

International Preliminary Report on Patentability issued in PCT Application No. PCT/US2019/067046, dated Jul. 1, 2021, 9 pages.

Second Office Action issued in the CN application 201780041754.3 dated Jul. 21, 2021, 10 pages with English translation.

\* cited by examiner

ISOLATION PLUGS FOR ENHANCED GEOTHERMAL SYSTEMS

CROSS-REFERENCE TO RELATED APPLICATION

The present document is based on and claims priority to U.S. Provisional Application Ser. No. 63/027,242, filed May 19, 2020, which is incorporated herein by reference in its entirety.

BACKGROUND

Well drilling and fracturing operations are sometimes performed to facilitate retrieval of a subterranean resource, e.g., oil, natural gas, enhanced geothermal system (EGS), or other desired subterranean resources. In particular, EGS presents an enormous potential as a renewable energy resource. One of the key technologies to enable the production of geothermal energy from EGS is isolation plugs to facilitate the stimulation of geothermal wells. Accordingly, there is a need for isolation plugs for stimulations of unconventional geothermic reservoirs that can withstand the higher temperatures of geothermal wells.

SUMMARY

In one or more embodiments of the present disclosure, an elastomer element has a temperature rating of at least 400° F. for enhanced geothermal system applications. The elastomer element may be manufactured via an additive manufacturing process, and the elastomer element may be a component of an isolation plug assembly having a plurality of structural components that may also be manufactured via the additive manufacturing process, according to one or more embodiments of the present disclosure.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

In the specification and appended claims: the terms "up" and "down," "upper" and "lower," "upwardly" and "downwardly," "upstream" and "downstream," "uphole" and "downhole," "above" and "below," "top" and "bottom," "left" and "right," and other like terms indicating relative positions above or below a given point or element are used in this description to more clearly describe some embodiments of the disclosure.

The present disclosure generally relates to tools to complete subterranean wells. More specifically, one or more embodiments of the present disclosure relate to apparatus and methods used in the stimulation of geothermal wells.

During a fracturing operation, an isolation plug (e.g., frac plug or bridge plug) may be deployed downhole and set at a desired location along a wellbore. The isolation plug allows pressure to be applied downhole and out through perforations into the surrounding formation, thus enabling fracturing or stimulation of the formation. In particular, according to one or more embodiments of the present disclosure, the isolation plug isolates upper and lower zones in cased injection or production wells in geothermal reservoirs to enable effective stimulation of the formation. According to one or more embodiments of the present disclosure, key enabling technologies include isolation plugs (or other downhole tools) having high-strength, high temperature elastomers and structural components that may or may not be degradable, and optionally, high-performance coatings, that perform reliably at bottom-hole temperatures of 400° F. and above. Moreover, one or more embodiments of the present disclosure implement additive manufacturing, i.e., 3D-printing, to realize the aforementioned technologies for evaluation and deployment in a geothermal well.

Figure 1:
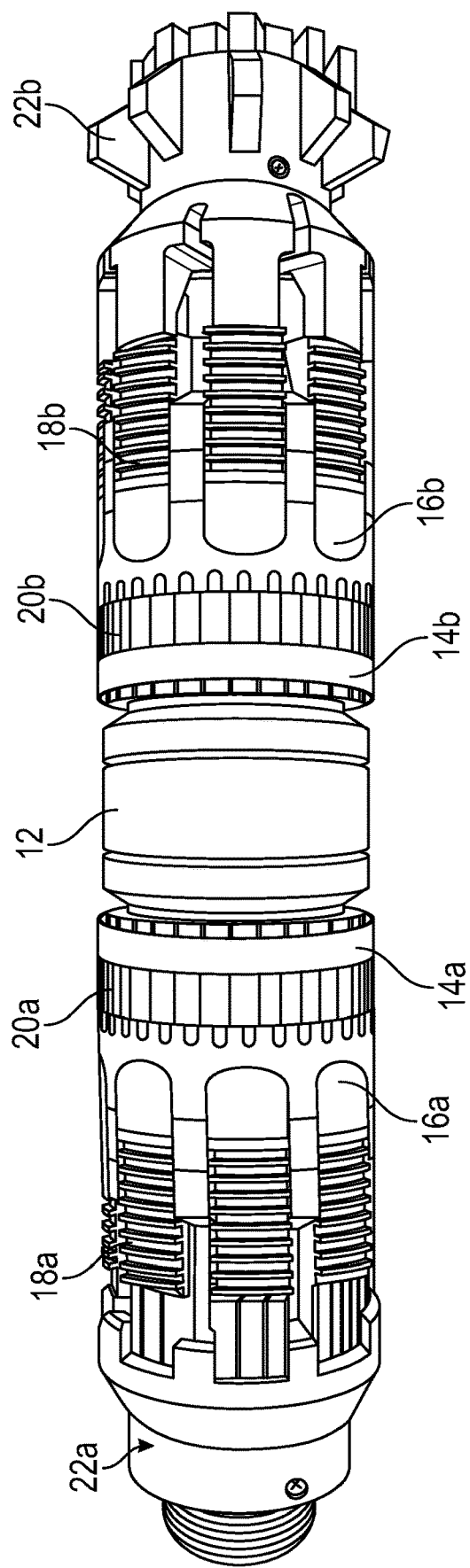
FIG. 1 shows an isolation plug for EGS according to one or more embodiments of the present disclosure.

Referring now to FIG. 1, an isolation plug 10 for EGS according to one or more embodiments of the present disclosure is shown. As shown in FIG. 1, the isolation plug 10 may include an elastomer element 12 according to one or more embodiments of the present disclosure. In one or more embodiments, the elastomer element 12 has a temperature rating of at least 400° F., making it suitable for EGS applications. That is, the elastomer element 12 according to one or more embodiments of the present disclosure is designed to effectively seal and isolate well zones for fracturing operations in geothermal well conditions. Further, while the elastomer element 12 is shown as a component of the isolation plug 10 in FIG. 1, the elastomer element 12 may be a component of other types of downhole tools for applications in high temperature downhole environments, for example, without departing from the scope of the present disclosure.

Figure 2:
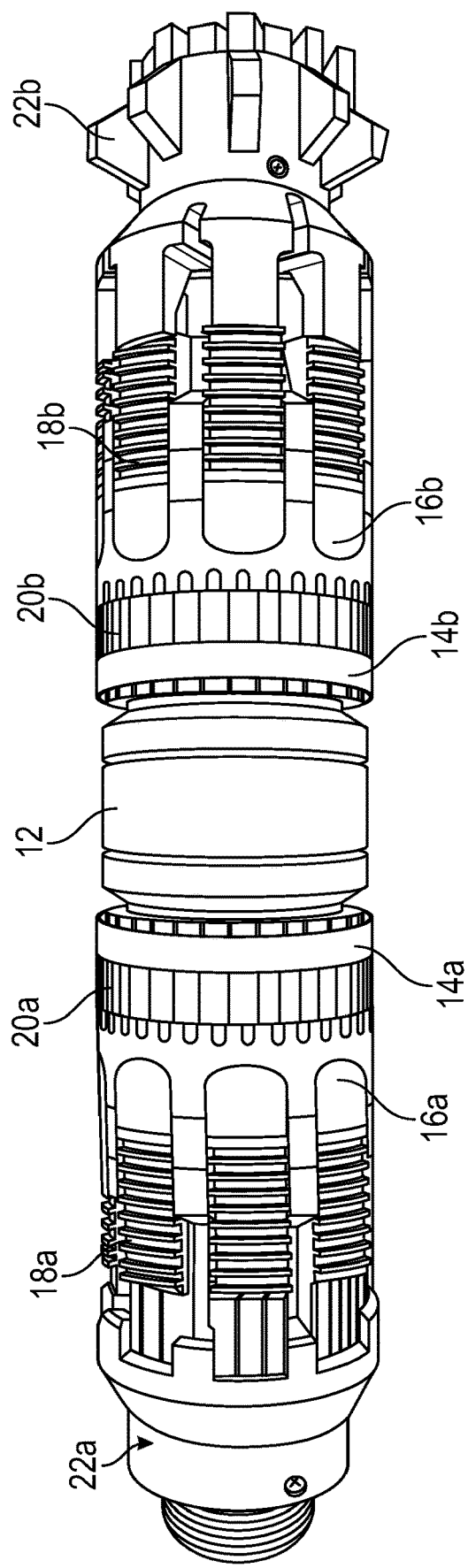
FIG. 2 shows an isolation plug for EGS having degradable components according to one or more embodiments of the present disclosure.

Referring now to FIG. 2, an isolation plug 10 for EGS having degradable components according to one or more embodiments of the present disclosure is shown. That is, the elastomer element 12 may be degradable according to one or more embodiments of the present disclosure. In one or more embodiments of the present disclosure, the elastomer element 12 may be made from high-temperature degradable elastomers based on polyester, polyurethane, and/or polyamide, for example. In one or more embodiments of the present disclosure, the sealing elastomer element 12 may be made of low-modulus, high-elongation metal materials, for example.

As further shown in FIGS. 1 and 2, the elastomer element 12 may be made via additive manufacturing, i.e., 3D-printing, according to one or more embodiments of the present disclosure. That is, in a method according to one or more embodiments of the present disclosure, a three-dimensional computer model of the elastomer element is created, and the elastomer element 12 is formed with an additive manufacturing process from the three-dimensional computer model.

As further shown in FIGS. 1 and 2, the isolation plug 10 according to one or more embodiments of the present disclosure may include a plurality of structural components in addition to the elastomer element 12. For example, in one or more embodiments, the isolation plug 10 may include a lower barrier ring 14b and an upper barrier ring 14a disposed on either side of the elastomer element 12; an upper cone 16a disposed above the upper barrier ring 14a; a lower cone 16b disposed below the lower barrier ring 14a; an upper slip assembly 18a cooperative with the upper cone 16a; and a lower slip assembly 18b cooperative with the lower cone 16b. As further shown in FIGS. 1 and 2, the isolation plug 10 may also include an upper back-up ring 20a disposed between the upper cone 16a and the upper barrier ring 14a, and a lower back-up ring 20b disposed between the lower cone 16b and the lower barrier ring 14b. As further shown in FIGS. 1 and 2, the isolation plug 10 may also include an upper sub 22a and a bottom sub 22b according to one or more embodiments of the present disclosure.

Figure 3:
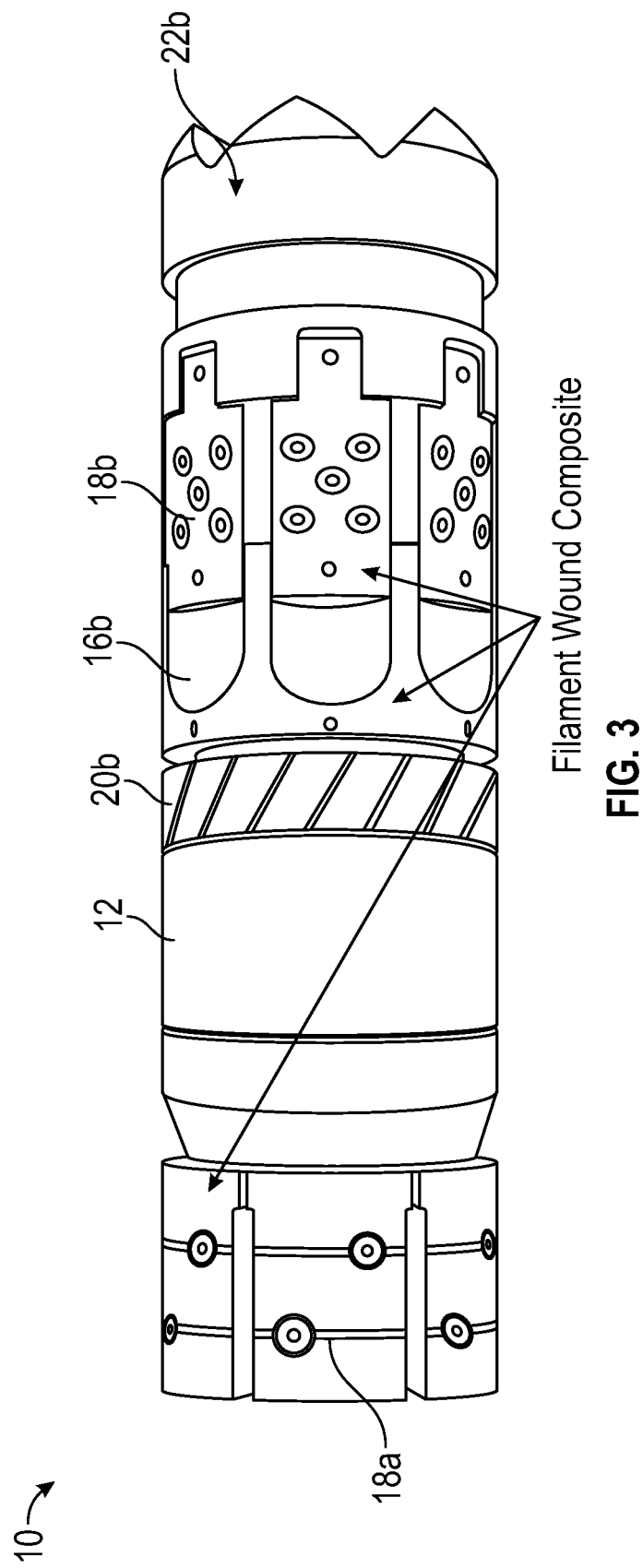
FIG. 3 shows an isolation plug for EGS according to one or more embodiments of the present disclosure.

As further shown in FIG. 1, one or both of the upper cone 16a, the lower cone 16b, the upper barrier ring 14a, and the lower barrier ring 14b of the isolation plug 10 may include aluminum. As shown in FIG. 2, which is further described below, one or both of the upper cone 16a, the lower cone 16b, the upper barrier ring 14a, and the lower barrier ring 14b of the isolation plug 10 may include degradable aluminum according to one or more embodiments of the present disclosure. In one or more embodiments of the present disclosure, the structural components of the isolation plug 10 include degradable aluminum alloys, such as SLB Blend AB/C, and magnesium alloys that maintain sufficiently high yield strength and ultimate tensile strength over 400° F., such that the structural components are able to withstand critical loads during setting and pressurization. As shown in FIG. 3, which is further described below, one or both of the upper cone 16a and the lower cone 16b may include a plurality of reinforcing fibers (or filament wound composite) according to one or more embodiments of the present disclosure. Further, one or more of the upper cone 16a, the lower cone 16b, the upper barrier ring 14a, and the lower barrier ring 14b of the isolation plug 10 may be manufactured via additive manufacturing according to one or more embodiments of the present disclosure.

As further shown in FIG. 1, the upper slip assembly 18a and the lower slip assembly 18b may include a high hardness steel material in one or more embodiments of the present disclosure. Such a high hardness steel material enables the upper slip assembly 18a and the lower slip assembly 18b to bite into a casing of a wellbore, thereby anchoring the isolation plug 10. While FIG. 1 shows that the upper slip assembly 18a and the lower slip assembly 18b may each include a plurality of slips having a plurality of wickers to facilitate gripping and biting the casing, the plurality of slips may include buttons, for example, without departing from the scope of the present disclosure. As shown in FIG. 2, which is further described below, one or both of the upper slip assembly 18a and the lower slip assembly 18b may include high hardness degradable metal-matrix composites (MMC), according to one or more embodiments of the present disclosure. Such high hardness MMC material enables the upper slip assembly 18a and the lower slip assembly 18b to bite into a casing of a wellbore, thereby anchoring the isolation plug 10. As shown in FIG. 3, which is further described below, one or more of the upper slip assembly 18a and the lower slip assembly 18b may include a plurality of reinforcing fibers, according to one or more embodiments of the present disclosure. Further, one or both of the upper slip assembly 18a and the lower slip assembly 18b may be manufactured via additive manufacturing according to one or more embodiments of the present disclosure.

As further shown in FIG. 1, one or both of the upper back-up ring 20a and the lower back-up ring 20b may include a high-temperature (i.e., at least 400° F.) thermoplastic part according to one or more embodiments of the present disclosure. As shown in FIG. 2, which is further described below, one or both of the upper back-up ring 20a and the lower back-up ring 20b may include a high temperature (i.e., at least 400° F.) degradable thermoplastic or composite part, according to one or more embodiments of the present disclosure. Such materials may also be used in anti-extrusion devices within the isolation plug 10 according to one or more embodiments of the present disclosure. Further, one or both of the upper back-up ring 20a and the lower back-up ring 20b of the isolation plug 10 may be manufactured via additive manufacturing according to one or more embodiments of the present disclosure.

As further shown in the FIG. 1, the isolation plug 10 may also include a top sub 22a above the upper slip assembly 18a, and a bottom sub 22b below the lower slip assembly 18b, according to one or more embodiments of the present disclosure. As further shown in FIG. 1, one or both of the top sub 22a and the bottom sub 22b of the isolation plug may include aluminum. As shown in FIG. 2, which is further described below, one or both of the top sub 22a and the bottom sub 22b may include degradable aluminum according to one or more embodiments of the present disclosure. In one or more embodiments of the present disclosure, the structural components of the isolation plug 10 include degradable aluminum alloys, such as SLB Blend AB/C, and magnesium alloys that maintain sufficiently high yield strength and ultimate tensile strength over 400° F. such that the structural components are able to withstand critical loads during setting and pressurization. Further, one or both of the top sub 22a and the bottom sub 22b of the isolation plug 10 may be manufactured via additive manufacturing according to one or more embodiments of the present disclosure.

Still referring to FIGS. 1 and 2, as previously described, the isolation plug 10 according to one or more embodiments of the present disclosure may include an elastomer element 12 that may or may not be degradable, and that may be manufactured via additive manufacturing. Moreover, other structural components of the isolation plug 10 may be made of metal alloys, such as aluminum and/or magnesium alloys, for example. Further, the other structural components of the isolation plug 10 can be manufactured via additive manufacturing using numerous thermoplastics, composite materials, and/or reinforcing fibers (FIG. 3) without departing from the scope of the present disclosure.

Referring now to FIG. 3, an isolation plug for EGS according to one or more embodiments of the present disclosure is shown. As shown, the isolation plug shown in FIG. 3 has a smaller footprint than the isolations plugs shown in FIGS. 1 and 2, for example. Indeed, an isolation plug according to one or more embodiments of the present disclosure may include an elastomer element 12, a back-up ring disposed on one side of the element, and only one slip assembly 18b that is cooperative with a single cone 16b. The isolation plug according to one or more embodiments of the present disclosure may include additional features, such as an upper slip assembly 18a and a bottom sub 22b, as shown in FIG. 3 for example.

A method of manufacturing the isolation plug 10 (or other downhole tool) according to one or more embodiments of the present disclosure may include creating a three-dimensional computer model of the isolation plug 10, and forming the isolation plug 10 with an additive manufacturing process from the three-dimensional computer model. In one or more embodiments of the present disclosure, at least a portion or the entirety of the isolation plug 10 may be made by additive manufacturing (i.e., 3D printing). Advantageously, the method according to one or more embodiments of the present disclosure allows the isolation plug 10 to be fully printed as an assembly without the need for a dedicated assembly process. In one or more embodiments, two components of the isolation plug 10 may be printed where the two components will be held together with "printed tabs" that "break" and allow component translation upon application of load or displacement. Moreover, in one or more embodiments of the present disclosure, the printing may be staged such that the printing process is paused to insert previously printed or other components into the assembly, after which the printing can resume. As another advantage, the method according to one or more embodiments of the present disclosure allows for rapid product customization within the need for high capital costs associated with molds and other special tooling.

Moreover, in one or more embodiments of the present disclosure where at least a portion of the isolation plug 10 includes a plurality of reinforcing fibers, the plurality of reinforcing fibers may be continuous, thereby providing greater mechanical strength for EGS applications than discontinuous or chopped fibers. That is, with the advancements in 3D printing, especially with continuous fibers, the isolation plug 10 may be printed without any fiber discontinuity by laying continuous fibers in the shape of the components. In such embodiments of the present disclosure, the continuous reinforcing fibers may include a base nylon layer and a fiberglass reinforcement, for example. In this way, a 3D-printable fiberglass composite frac plug that is suitable for the high temperature (i.e., at least 400° F.) zonal isolation required in EGS may be manufactured in accordance with one or more embodiments of the present disclosure.

More specifically, in one or more embodiments of the present disclosure, isolation plugs, such as composite frac plugs, may be 3D-printed using either continuous or chopped fiber reinforcement layers coupled with high temperature resin to provide the requisite strength for zonal isolation in EGS applications. Advantageously, additive manufacturing processes eliminate the need for conventional, high cost, manufacturing practices such as machining, injection, and compression molding. Additive manufacturing also allows better control in material reinforcement around critical design features such as holes or grooves, for example. In order to meet the high temperature requirements for EGS, various reinforcing materials may be added to the base layer to make the composite structure stronger in various dynamic loading scenarios at elevated temperatures. According to one or more embodiments of the present disclosure, additive manufacturing achieves a fiberglass composite part that has comparable mechanical properties in the XY, YZ, and XZ directions as compared to the filament wound parts. Further, in one or more embodiments of the present disclosure, high temperature reinforcing materials may be added to the composite structure to enable an increase in the glass transition temperature of the composite structure.

According to one or more embodiments of the present disclosure, using continuous reinforcing fibers in additive manufacturing processes achieves metal-like strength for the resulting structure. The strength of a fiber reinforced part comes from the combined strength of the plastic and the continuous fiber strands woven throughout the part. That is, using continuous reinforcing fibers in additive manufacturing processes can manufacture parts that are comparable to aluminum in strength and stiffness. Moreover, using continuous reinforcing fibers in additive manufacturing processes can enhance the durability of a part by increasing its life span. Continuous reinforcing fibers advantageously strengthen the part far beyond traditional plastics. That is, a part that has been reinforced with continuous fibers can remain more effective and functional over an extended period of time than a standard plastic part, especially in EGS applications. Moreover, continuous fiber fabrication provides a way for a part to be selectively reinforced for the part's intended use. That is, a part's strength profile may be tailored exactly for its application by adding continuous fibers where strength is needed most.

As previously described, the elastomer element 12 and one or more structural components of the isolation plug 10 may be degradable according to one or more embodiments of the present disclosure. That is, according to one or more embodiments of the present disclosure, the elastomer element 12 and one or more structural components of the isolation plug 10 may self degrade in geothermal wells. Advantageously, in such embodiments of the present disclosure, removal of the isolation plug 10 may be interventionless, and the need to use coiled tubing milling of the isolation plug 10 after stimulation of the geothermal well may be eliminated. In one or more embodiments of the present disclosure, the degradation time of the elastomer element 12 or one or more of the structural components of the isolation plug 10 may be tailored based on the material of the elastomer element 12 or component, the application of coating formulations, and/or mechanical design. In one or more embodiments of the present disclosure, coatings may be applied to the elastomer element 12 or any of the structural components of the isolation plug 10 as individual parts, or to the entire assembly of the isolation plug 10 post-assembly to lengthen the usual lifetime of the isolation plug 10 and to enhance the reliability of the isolation plug 10, for example.

In a method according to one or more embodiments of the present disclosure, the isolation plug 10 (or other downhole tool) may be deployed into a cased wellbore and anchored to the cased wellbore. Once anchored, the isolation plug 10 provides zonal isolation within the cased wellbore to enable effective stimulation of the formation. After the stimulation operation, at least a portion of the isolation plug 10 (or other downhole tool) may be degraded for interventionless removal of the isolation plug 10 from the wellbore. In one or more embodiments of the present disclosure, at least one indicator, such as a sensor or a tracer, for example, may be embedded inside one or more components of the isolation plug 10 before the isolation plug 10 is deployed downhole for the stimulation operation. In such embodiments of the present disclosure, degradation of one or more components of the isolation plug 10 after the stimulation operation may release the at least one embedded indicator for return to the surface. In one or more embodiments of the present disclosure, different indicators may be installed into different wells and stages to provide detailed readings. In one or more embodiments of the present disclosure, temperature, pressure, and fluid (e.g., pH, $H_2S$, salinity) sensors, including balls and mandrels for example, can be used to measure and record the environmental parameters of a geothermal well. Returning such embedded indicators to the surface via degradation of one or more components of the isolation plug 10 may enable a comprehensive understanding about the stimulation efficiency of geothermal injection and production wells.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A downhole tool, comprising:
an element comprising an elastomer having a temperature rating of at least 400° F.;
a lower barrier ring and an upper barrier ring disposed on either side of the element;
an upper cone disposed above the upper barrier ring;
a lower cone disposed below the lower barrier ring;
an upper slip assembly cooperative with the upper cone;
a lower slip assembly cooperative with the lower cone; and
an indicator embedded within a degradable portion of the downhole tool, wherein, upon at least partial degradation of the degradable portion, the indicator is released from the downhole tool.

2. The downhole tool of claim 1, further comprising:
an upper back-up ring disposed between the upper cone and the upper barrier ring; and
a lower back-up ring disposed between the lower cone and the lower barrier ring.

3. The downhole tool of claim 2, wherein the upper back-up ring and the lower back-up ring comprise at least one material selected from the group consisting of: a thermoplastic; a composite; and a degradable composite.

4. The downhole tool of claim 1, wherein the upper cone, the lower cone, the lower barrier ring, and the upper barrier ring comprise aluminum.

5. The downhole tool of claim 4, wherein the upper cone, the lower cone, the lower barrier ring, and the upper barrier ring comprise degradable aluminum.

6. The downhole tool of claim 1, wherein at least one of the upper cone, the lower cone, the upper slip assembly, and the lower slip assembly comprises a plurality of reinforcing fibers.

7. A method of manufacturing a downhole tool, comprising:
creating a three-dimensional computer model of the downhole tool of claim 1; and
forming the downhole tool with an additive manufacturing process from the three-dimensional computer model.

8. The method of claim 7, wherein the element and at least one of the upper cone, the lower cone, the upper slip assembly, the lower slip assembly, the upper barrier ring, the lower barrier ring, the upper back-up ring, and the lower back-up ring are formed with the additive manufacturing process from the three-dimensional computer model.

9. A method comprising:
deploying the downhole tool of claim 1 into a cased wellbore;
anchoring the downhole tool to the cased wellbore;
initiating a stimulation operation; and
degrading at least Hall the portion of the downhole tool after the stimulation operation to release the indicator for returning to a surface.

10. The method of claim 9, wherein the at least one embedded indicator is a sensor or a tracer.

* * * * *